(12) United States Patent
Du et al.

(10) Patent No.: US 11,011,163 B2
(45) Date of Patent: May 18, 2021

(54) METHOD AND APPARATUS FOR RECOGNIZING VOICE

(71) Applicant: Baidu Online Network Technology (Beijing) Co., Ltd., Beijing (CN)

(72) Inventors: Niandong Du, Beijing (CN); Yan Xie, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 119 days.

(21) Appl. No.: 16/049,470

(22) Filed: Jul. 30, 2018

(65) Prior Publication Data

US 2019/0103109 A1    Apr. 4, 2019

(30) Foreign Application Priority Data

Sep. 29, 2017   (CN) .......................... 201710909504.9

(51) Int. Cl.
*G10L 15/22* (2006.01)
*G06F 3/16* (2006.01)
*G10L 17/00* (2013.01)

(52) U.S. Cl.
CPC .............. *G10L 15/22* (2013.01); *G06F 3/167* (2013.01); *G10L 17/00* (2013.01); *G10L 2015/223* (2013.01); *G10L 2015/227* (2013.01)

(58) Field of Classification Search
CPC ......... G10L 15/22; G10L 15/04; G10L 15/05; G10L 15/16; G10L 15/1815; G10L 15/197; G10L 17/005; G10L 2015/088; G10L 2015/223; G10L 2015/227; G10L 25/51

USPC ......................................................... 704/275
See application file for complete search history.

(56) References Cited

U.S. PATENT DOCUMENTS

| 9,122,376 B1* | 9/2015 | Brotherston .......... G06F 3/0237 |
| 2014/0129228 A1* | 5/2014 | Lai .......................... G10L 13/00 704/260 |
| 2017/0154623 A1 | 6/2017 | Kibre et al. |

FOREIGN PATENT DOCUMENTS

| CN | 102365639 A | * | 2/2012 | ......... G10L 15/1815 |
| CN | 103140889 A | | 6/2013 | |
| CN | 104407834 A | | 3/2015 | |
| CN | 104795069 A | | 7/2015 | |
| CN | 105791404 A | | 7/2016 | |
| CN | 105895103 A | | 8/2016 | |
| CN | 106384593 A | | 2/2017 | |
| CN | 106469554 A | | 3/2017 | |

* cited by examiner

*Primary Examiner* — Bharatkumar S Shah
(74) *Attorney, Agent, or Firm* — Knobbe Martens Olson & Bear LLP

(57) ABSTRACT

Embodiments of the present disclosure disclose a method and apparatus for recognizing voice. A specific implementation of the method comprises: receiving voice information sent by a user through a terminal, and acquiring simultaneously a user identifier of the user; recognizing the voice information to obtain a first recognized text; determining a word information set stored in association with the user identifier of the user based on the user identifier of the user; and processing the first recognized text based on word information in the determined word information set to obtain a second recognized text, and sending the second recognized text to the terminal. The implementation improves the accuracy of voice recognition and meets a personalized need of a user.

5 Claims, 4 Drawing Sheets

METHOD AND APPARATUS FOR RECOGNIZING VOICE

CROSS-REFERENCE TO RELATED APPLICATION

This application is related to and claims priority from Chinese Application No. 201710909504.9, filed on Sep. 29, 2017 and entitled "Method and Apparatus for Recognizing Voice," the entire disclosure of which is hereby incorporated by reference.

TECHNICAL FIELD

Embodiments of the present disclosure relate to the technical field of computers, specifically to the technical field of information processing, and more specifically to a method and apparatus for recognizing voice.

BACKGROUND

In a current voice recognition process, after a user sends voice information to a server through a terminal, the server performs voice recognition on the voice information to obtain the text information corresponding to the voice information. The server sends the text information to the terminal for the terminal to display. At the present, the server generally uses an identical means to process voice information inputted by different users. Therefore, when different users send identical voice information, the text information recognized by the server is identical.

SUMMARY

An objective of embodiments of the present disclosure is to provide a method and apparatus for recognizing voice.

In a first aspect, the embodiments of the present disclosure provide a method for recognizing voice, and method includes: receiving voice information sent by a user through a terminal, and acquiring simultaneously a user identifier of the user; recognizing the voice information to obtain a first recognized text; determining a word information set stored in association with the user identifier of the user based on the user identifier of the user; and processing the first recognized text based on word information in the determined word information set to obtain a second recognized text, and sending the second recognized text to the terminal.

In some embodiments, the word information in the word information set includes a historical character string inputted by the user through an input method application, an input result corresponding to the historical character string, and a candidate result corresponding to the historical character string.

In some embodiments, the method further includes: receiving input record information sent by a target terminal used by the user, wherein the input record information is generated by the target terminal upon detecting an input result of an input character string inputted by the user through an input method application being inconsistent with a candidate result provided by the input method application for the input character string, and the input record information includes the user identifier of the user, the input result of the input character string inputted by the user through the input method application, and the candidate result provided by the input method application for the input character string; and storing the input result of the input character string inputted by the user through the input method application and the candidate result provided by the input method application for the input character string in the input record information into the word information set associated with the user identifier of the user.

In some embodiments, the processing the first recognized text based on the word information in the determined word information set to obtain the second recognized text includes: determining whether the first recognized text includes the candidate result corresponding to the historical character string in the word information set; and in response to determining the first recognized text including the candidate result corresponding to the historical character string in the word information set, replacing the candidate result corresponding to the historical character string with the input result corresponding to the historical character string.

In a second aspect, the embodiments of the present disclosure provide an apparatus for recognizing voice, and apparatus includes: a first receiving unit, configured to receive voice information sent by a user through a terminal, and acquire simultaneously a user identifier of the user; a receiving unit, configured to recognize the voice information to obtain a first recognized text; a determining unit, configured to determine a word information set stored in association with the user identifier of the user based on the user identifier of the user; and a sending unit, configured to process the first recognized text based on word information in the determined word information set to obtain a second recognized text, and send the second recognized text to the terminal.

In some embodiments, the word information in the word information set includes a historical character string inputted by the user through an input method application, an input result corresponding to the historical character string, and a candidate result corresponding to the historical character string.

In some embodiments, the apparatus further includes: a second receiving unit, configured to receive input record information sent by a target terminal used by the user, wherein the input record information is generated by the target terminal upon detecting an input result of an input character string inputted by the user through an input method application being inconsistent with a candidate result provided by the input method application for the input character string, and the input record information includes the user identifier of the user, the input result of the input character string inputted by the user through the input method application, and the candidate result provided by the input method application for the input character string; and a storing unit, configured to store the input result of the input character string inputted by the user through the input method application and the candidate result provided by the input method application for the input character string in the input record information into the word information set associated with the user identifier of the user.

In some embodiments, the sending unit is further configured to: determine whether the first recognized text includes the candidate result corresponding to the historical character string in the word information set; and in response to determining the first recognized text including the candidate result corresponding to the historical character string in the word information set, replace the candidate result corresponding to the historical character string with the input result corresponding to the historical character string.

In a third aspect, the embodiments of the present application provide a server including: one or more processors, and a storage apparatus for storing one or more programs, and the one or more programs, when executed by the one or more processors, causing the one or more processors to implement the method described in any implementation in the first aspect.

In a fourth aspect, the embodiments of the present disclosure provide a computer readable storage medium storing a computer program thereon, the computer program, when executed by a processor, implementing the method as described in any implementation in the first aspect.

The method and apparatus for recognizing voice, provided by the embodiments of the present disclosure include: first, receiving voice information sent by a user through a terminal, and acquiring simultaneously a user identifier of the user; next, recognizing the voice information to obtain a first recognized text; then, determining a word information set stored in association with the user identifier of the user based on the user identifier of the user; and finally, processing the first recognized text based on word information in the determined word information set to obtain a second recognized text, and sending the second recognized text to the terminal. Therefore, the accuracy of voice recognition is improved, and a personalized need of the user is met.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
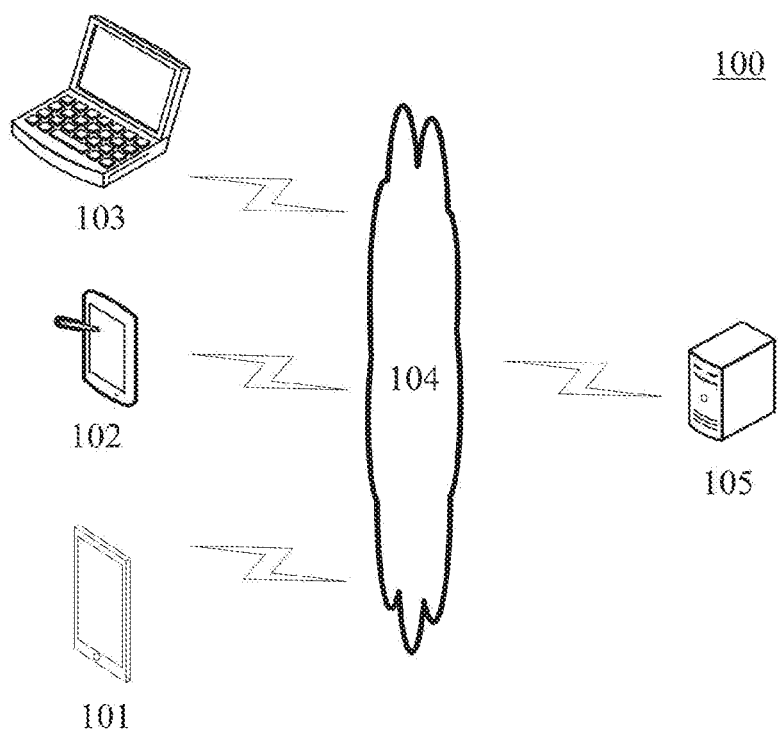
FIG. 1 is an architectural diagram of an exemplary system in which embodiments of the present disclosure may be implemented.

FIG. 1 shows an exemplary architecture of a system 100 which may be used by a method for recognizing voice or an apparatus for recognizing voice according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to receive or transmit messages, etc. Various client applications, such as web browser applications, shopping applications, search applications, instant messaging tools, mailbox clients, and social platform software may be installed on the terminal devices 101, 102 and 103.

The terminal devices 101, 102 and 103 may be various electronic devices having display screens and supporting voice input, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server that supports for information displayed on the terminal devices 101, 102 or 103. The backend server may perform processing including voice recognition on data such as received voice information, and return a processing result (for example, text information) to the terminal devices.

It should be noted that the method for recognizing voice according to the embodiments of the present disclosure is generally executed by the server 105. Accordingly, an apparatus for recognizing voice is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
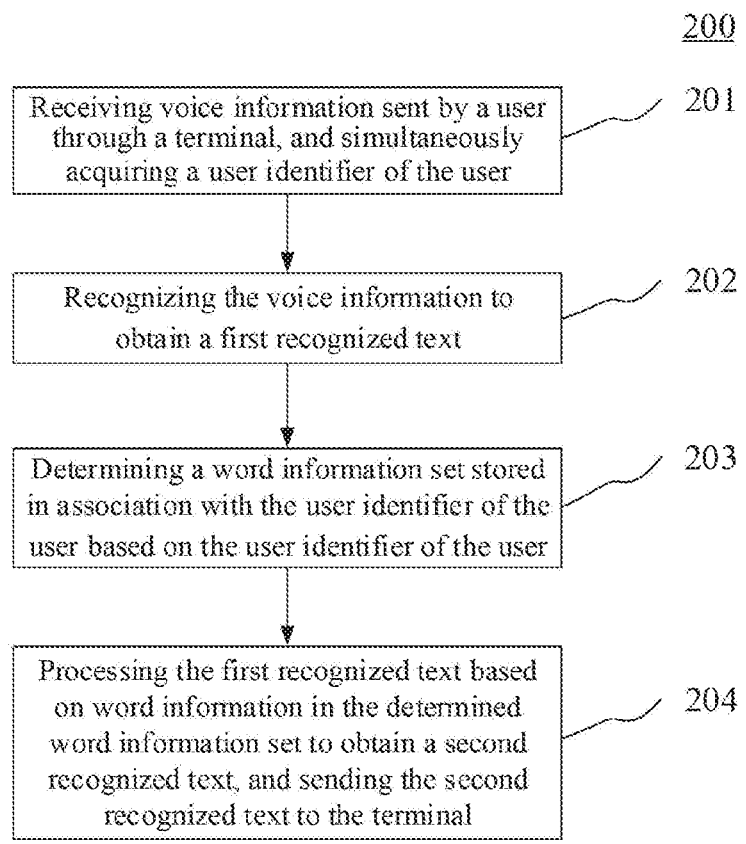
FIG. 2 is a flowchart diagram of an embodiment of a method for recognizing voice according to the present disclosure.

Further referring to FIG. 2, FIG. 2 shows a flow 200 of an embodiment of the method for recognizing voice according to the present disclosure. The method for recognizing voice includes the following steps.

Step 201, receiving voice information sent by a user through a terminal, and acquiring simultaneously a user identifier of the user.

In the present embodiment, an electronic device (e.g. the server 105 shown in FIG. 1) on which the method for recognizing voice is performed may receive voice information in a wired connection mode or a wireless connection mode from a terminal through which the user inputs the voice information. The voice information refers to the information sent by the user in the form of voice. Meanwhile, the electronic device may also acquire the user identifier of the user, and the user identifier may be various identifiers for indicating the identity of the user, such as an account number, a user name, a nickname, etc. It should be noted that, the above wireless connection mode may include, but is not limited to, 3G/4G connection, a WiFi connection, Bluetooth connection, WiMAX connection, Zigbee connection, ultra wideband (UWB) connection, and other currently known or future developed wireless connection modes.

Step 202, recognizing the voice information to obtain a first recognized text.

In the present embodiment, on the basis of the voice information received in step 201, the electronic device may recognize the voice information to obtain the first recognized text. It should be noted that, how to perform word recognition on voice is a well-known technology widely studied and applied at present and will not be repeatedly described here.

Step 203, determining a word information set stored in association with the user identifier of the user based on the user identifier of the user.

In the present embodiment, at least one word information set stored in association with the user identifier may be stored in the electronic device in advance. The word information set may include at least one input character string, an input result corresponding to the input character string, and a candidate result corresponding to the input character string. The input character string may refer to a character string inputted by the user through a keyboard and the like in a certain information input process, for example, Chinese pinyin. The input result corresponding to the input character string may refer to a text actually input by the user in this information input process. The candidate result corresponding to the input character string may be a result that may be probably recognized by a server for the input character string. The word information in the word information set may be obtained in various ways, for example, the word information may be set by the user based on his own actual needs. As an example, the server performs voice recognition on voice information sent by a user A, and sends a recognized text that has been recognized to a terminal used by the user A; based on the recognized text displayed by the terminal, the user A determines that the recognized text recognized by the server is inconsistent with a target text actually needed; and at this time, the user may use the Chinese pinyin corresponding to the recognized text as an input character string, use the target text as an input result, and use the recognized text as a candidate result to set the word information in the word information set. Based on the user identifier of the user acquired in step 201, the electronic device may determine the word information set stored in association with the user identifier of the user.

Step 204, processing the first recognized text based on word information in the determined word information set to obtain a second recognized text, and sending the second recognized text to the terminal.

In the present embodiment, the electronic device may process the first recognized text recognized in step 202 based on the word information in the word information set determined in step 203. For example, the electronic device may find, replace and delete a text in the first recognized text based on the word information in the determined word information set to obtain a processed second recognized text and send the second recognized text to the terminal for display by the terminal.

In some optional implementations of the present embodiment, the word information in the word information set may include a historical character string inputted by the user through an input method application, an input result corresponding to the historical character string, and a candidate result corresponding to the historical character string. The historical character string may be a character string composed of letters and the like, for example, the historical character string may be Chinese pinyin. As an example, the user may input a historical character string through an input method application installed on the terminal or other terminals. For the historical character string, the input method application may push a candidate result for the user. In some cases, the candidate result pushed by the input method application is inconsistent with the content that the user wants to input. For example, when a user named "Wei Jing" enters pinyin "weijing" through the input method application for the first time, the candidate result pushed by the input method application may be "monosodium glutamate" (with the Chinese pronunciation of weijing), "gastroscope" (with the Chinese pronunciation of weijing) and the like, whereas in fact the user wants to input her own name, and the final input result after adjustment is "Wei Jing".

In some optional implementations, the step 204 may specifically include: first, determining whether the first recognized text includes a candidate result corresponding to a historical character string in the word information set by the electronic device; and in response to determining that the first recognized text includes the candidate result corresponding to the historical character string in the word information set, replacing the candidate result corresponding to the historical character string with an input result corresponding to the historical character string by the electronic device. For example, the first recognized text is "call monosodium glutamate", and after comparative analysis and other processing, the electronic device may determine that the first recognized text includes a candidate result "monosodium glutamate" corresponding to the historical character string "weijing" in the word information set, and then replace "monosodium glutamate" in the first recognized text with the input result "Wei Jing" corresponding to the historical character string "weijing" to obtain the second recognized text.

In some optional implementations of the present embodiment, the method may further include the following steps.

First, the electronic device may receive input record information sent by a target terminal used by the user. The input record information may be generated by the target terminal detecting that an input result of an input character string inputted by the user through an input method application is inconsistent with a candidate result provided by the input method application for the input character string. The input record information may include the user identifier of the user, the input result of the input character string inputted by the user through the input method application, and the candidate result provided by the input method application for the input character string. The target terminal may be a terminal through which the user inputs information using the input method application installed thereon, and the target terminal may be the same as or different from a terminal through which the user sends voice information. As an example, the target terminal is associated with the user identifier of the user, and the target terminal may be associated with the word information set of the user through the user identifier.

Then, the electronic device may store the input result of the input character string inputted by the user through the input method application and the candidate result provided by the input method application for the input character string in the input record information into the word information set associated with the user identifier of the user.

Through the above implementation, the electronic device may continuously perfect the word information in the word information set stored in association with the user identifier of the user based on actual input requirements of the user.

Figure 3:
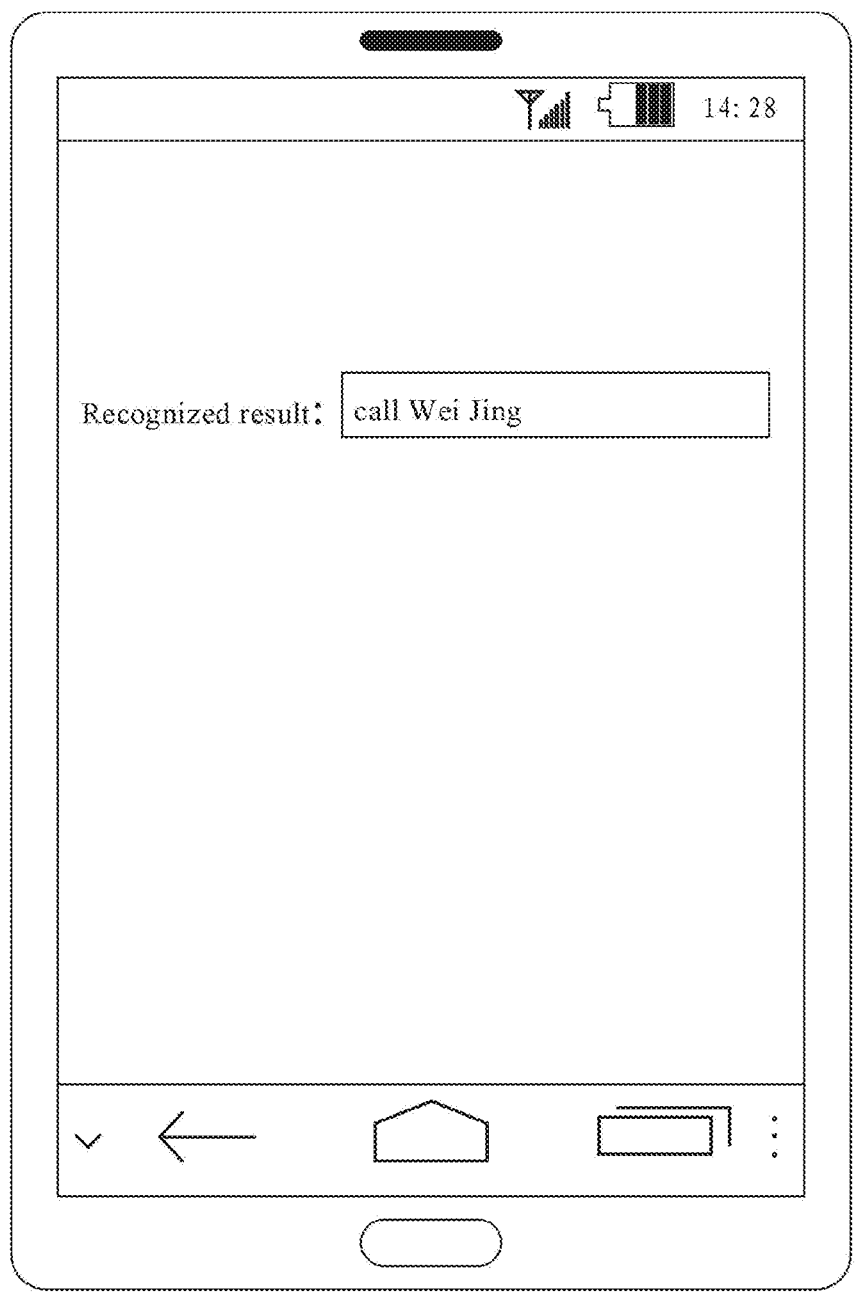
FIG. 3 is a schematic diagram of an application scenario of the method for recognizing voice according to an embodiment of the present disclosure.

Further referring FIG. 3, FIG. 3 is a schematic diagram of an application scenario of the method for recognizing voice based on an embodiment. In the application scenario of FIG. 3, first, the user sends voice information "call Wei Jing" through a smart phone, the smart phone may send the voice information to a server, and the server receives the voice information and acquires a user identifier of the user. Next, the server may recognize the voice information to obtain a first recognized text "call monosodium glutamate". Then, the server may determine a word information set stored in association with the user identifier of the user based on the user identifier of the user, the word information set stores a historical character string weijing, an input result Wei Jing corresponding to weijing, and a candidate result monosodium glutamate corresponding to weijing. Finally, the server replaces the "monosodium glutamate" in the first recognized text with "Wei Jing" based on the word information in the determined word information set to obtain a second recognized text "call Wei Jing" and sends the second recognized text to the smart phone used by the user for display by the smart phone, as shown in FIG. 3.

Based on the method provided by the above embodiment of the present disclosure, the recognized first recognized text is processed by using the word information set stored in association with the user identifier of the user, thereby improving the accuracy of voice recognition and meeting a personalized need of the user.

Figure 4:
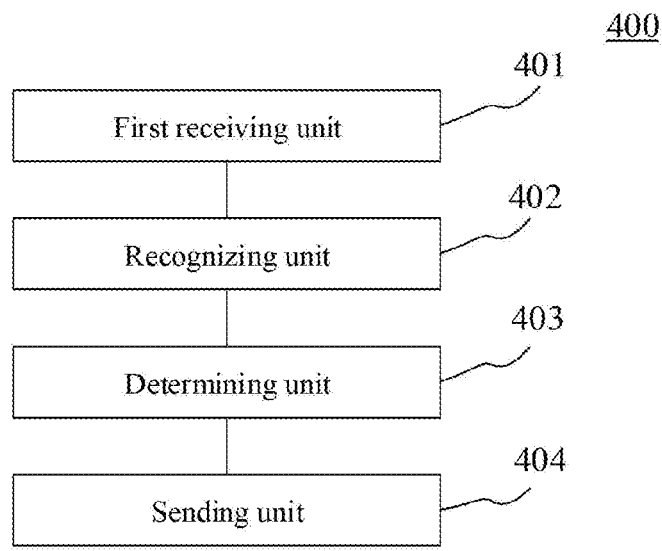
FIG. 4 is a schematic structural diagram of an embodiment of an apparatus for recognizing voice according to the present disclosure.

Further referring to FIG. 4, as an implementation of the method shown in the above figures, the present disclosure provides an embodiment of an apparatus for recognizing voice, the embodiment of the apparatus corresponds to the embodiment of the method shown in FIG. 2, and the apparatus may be specifically applied to various types of electronic devices.

As shown in FIG. 4, the apparatus 400 for recognizing voice in the present embodiment includes a first receiving unit 401, a recognizing unit 402, a determining unit 403 and a sending unit 404. The first receiving unit 401 is used for receiving voice information sent by a user through a terminal, and acquiring simultaneously a user identifier of the user; the recognizing unit 402 is used for recognizing the voice information to obtain a first recognized text; the determining unit 403 is used for determining a word information set stored in association with the user identifier of the user based on the user identifier of the user; and the sending unit 404 is used for processing the first recognized text based on word information in the determined word information set to obtain a second recognized text, and sending the second recognized text to the terminal.

In the present embodiment, the specific processing of the first receiving unit 401, the recognizing unit 402, the determining unit 403 and the sending unit 404 of the apparatus 400 for recognizing voice and technical effects thereof may refer to related descriptions of step 201, step 202, step 203 and step 204 in the corresponding embodiment in FIG. 2 respectively, and will not be repeatedly described here.

In some optional implementations of the present embodiment, the word information in the word information set includes a historical character string inputted by the user through an input method application, an input result corresponding to the historical character string, and a candidate result corresponding to the historical character string.

In some optional implementations of the present embodiment, the apparatus further includes: a second receiving unit (not shown), for receiving input record information sent by a target terminal used by the user. The input record information is generated by the target terminal upon detecting an input result of an input character string inputted by the user through an input method application being inconsistent with a candidate result provided by the input method application for the input character string, and the input record information includes the user identifier of the user, the input result of the input character string inputted by the user through the input method application, and the candidate result provided by the input method application for the input character string. The apparatus further includes a storing unit (not shown), for storing the input result of the input character string inputted by the user through the input method application and the candidate result provided by the input method application for the input character string in the input record information into the word information set associated with the user identifier of the user.

In some optional implementations of the present embodiment, the sending unit is further used for: determining whether the first recognized text includes a candidate result corresponding to a historical character string in the word information set; and in response to determining the first recognized text including the candidate result corresponding to the historical character string in the word information set, replacing the candidate result corresponding to the historical character string with an input result corresponding to the historical character string.

Figure 5:
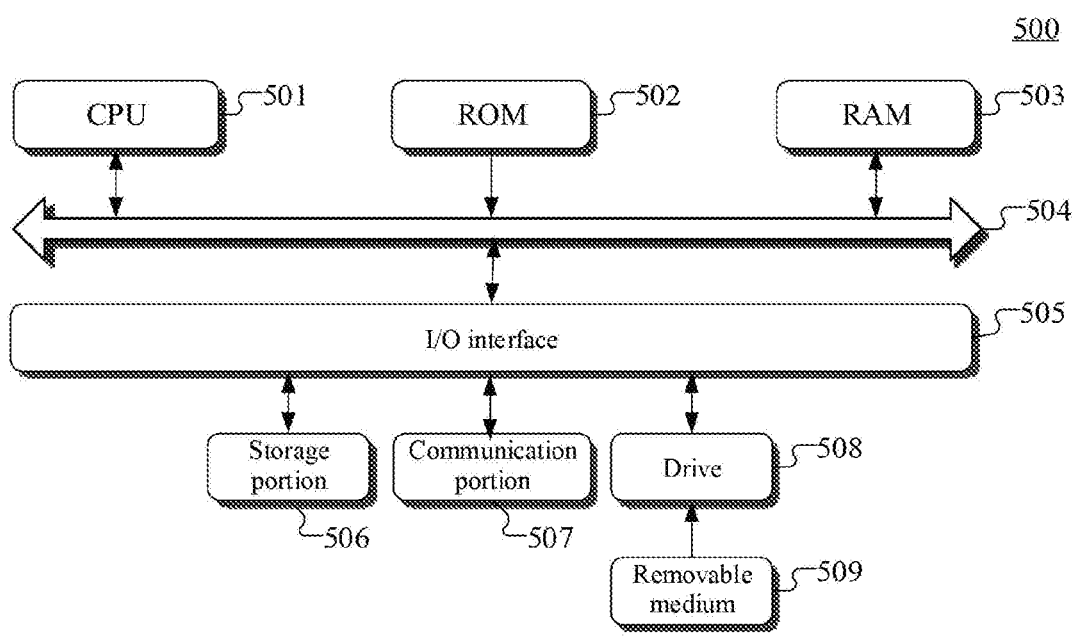
FIG. 5 is a schematic structural diagram of a computer system adapted to implement a server according to embodiments of the present disclosure.

Referring to FIG. 5, a schematic structural diagram of a computer system 500 adapted to implement a server of the embodiments of the present disclosure is shown. The server shown in FIG. 5 is merely an example, and should not bring any limitations to the functions and the scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 506. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: a storage portion 506 including a hard disk and the like; and a communication portion 507 comprising a network interface card, such as a local area network (LAN) card and a modem. The communication portion 507 performs communication processes via a network, such as the Internet. A driver 508 is also connected to the I/O interface 505 as required. A removable medium 509, such as a magnetic disk, an optical disk, a magneto-optical disk, and a semiconductor memory, may be installed on the driver 508, to facilitate the retrieval of a computer program from the removable medium 509, and the installation thereof on the storage portion 506 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 507, and/or may be installed from the removable medium 509. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a first receiving unit, a recognizing unit, a determining unit, and a sending unit, where the names of these units do not in some cases constitute a limitation to such units themselves. For example, the first receiving unit may also be described as "a unit for receiving voice information sent by a user through a terminal, and acquiring simultaneously a user identifier of the user".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a apparatus, cause the apparatus to: receiving voice information sent by a user through a terminal, and acquiring simultaneously a user identifier of the user; recognizing the voice information to obtain a first recognized text; determining a word information set stored in association with the user identifier of the user based on the user identifier of the user; and processing the first recognized text based on word information in the determined word information set to obtain a second recognized text, and sending the second recognized text to the terminal.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing voice, the method comprising:
   receiving voice information sent by a user through a terminal, and acquiring simultaneously a user identifier of the user;
   recognizing the voice information to obtain a first recognized text;
   determining a word information set stored in association with the user identifier of the user based on the user identifier of the user, wherein word information in the word information set comprises a historical character string inputted by the user through an input method application, an input result corresponding to the historical character string, and a candidate result corresponding to the historical character string, the input result corresponding to the historical character string being a text actually inputted by the user for the historical character string, the candidate result corresponding to the historical character string being a text pushed by the input method application for the historical character string;
   processing the first recognized text based on word information in the determined word information set to obtain a second recognized text, wherein the processing comprises: determining that the first recognized text comprises the candidate result corresponding to the historical character string in the word information set; and replacing the candidate result corresponding to the historical character string with the input result corresponding to the historical character string, in response to determining the first recognized text comprising the candidate result corresponding to the historical character string in the word information set; and
   sending the second recognized text to the terminal,
   wherein the method is performed by at least one processor.

2. The method according to claim 1, the method further comprising:
   receiving input record information sent by a target terminal used by the user, wherein the input record information is generated by the target terminal upon detecting an input result of an input character string inputted by the user through an input method application being inconsistent with a candidate result provided by the input method application for the input character string, and the input record information comprises the user identifier of the user, the input result of the input character string inputted by the user through the input method application, and the candidate result provided by the input method application for the input character string; and storing the input result of the input character string inputted by the user through the input method application and the candidate result provided by the input method application for the input character string in the input record information into the word information set associated with the user identifier of the user.

3. An apparatus for recognizing voice, the apparatus comprising:

at least one processor; and a memory storing instructions, the instructions when executed by the at least one processor, cause the at least one processor to perform operations, the operations comprising:

receiving voice information sent by a user through a terminal, and acquiring simultaneously a user identifier of the user;

recognizing the voice information to obtain a first recognized text;

determining a word information set stored in association with the user identifier of the user based on the user identifier of the user, wherein word information in the word information set comprises a historical character string inputted by the user through an input method application, an input result corresponding to the historical character string, and a candidate result corresponding to the historical character string, the input result corresponding to the historical character string being a text actually inputted by the user for the historical character string, the candidate result corresponding to the historical character string being a text pushed by the input method application for the historical character string;

processing the first recognized text based on word information in the determined word information set to obtain a second recognized text, wherein the processing comprises: determining that the first recognized text comprises the candidate result corresponding to the historical character string in the word information set; and replacing the candidate result corresponding to the historical character string with the input result corresponding to the historical character string, in response to determining the first recognized text comprising the candidate result corresponding to the historical character string in the word information set; and sending the second recognized text to the terminal.

4. The apparatus according to claim 3, the operations further comprising:

receiving input record information sent by a target terminal used by the user, wherein the input record information is generated by the target terminal upon detecting an input result of an input character string inputted by the user through an input method application being inconsistent with a candidate result provided by the input method application for the input character string, and the input record information comprises the user identifier of the user, the input result of the input character string inputted by the user through the input method application, and the candidate result provided by the input method application for the input character string; and storing the input result of the input character string inputted by the user through the input method application and the candidate result provided by the input method application for the input character string in the input record information into the word information set associated with the user identifier of the user.

5. A non-transitory computer storage medium storing a computer program, the computer program, when executed by one or more processors, causes the one or more processors to perform operations, the operations comprising:

receiving voice information sent by a user through a terminal, and acquiring simultaneously a user identifier of the user;

recognizing the voice information to obtain a first recognized text;

determining a word information set stored in association with the user identifier of the user based on the user identifier of the user, wherein word information in the word information set comprises a historical character string inputted by the user through an input method application, an input result corresponding to the historical character string, and a candidate result corresponding to the historical character string, the input result corresponding to the historical character string being a text actually inputted by the user for the historical character string, the candidate result corresponding to the historical character string being a text pushed by the input method application for the historical character string;

processing the first recognized text based on word information in the determined word information set to obtain a second recognized text, wherein the processing comprises: determining that the first recognized text comprises the candidate result corresponding to the historical character string in the word information set; and replacing the candidate result corresponding to the historical character string with the input result corresponding to the historical character string, in response to determining the first recognized text comprising the candidate result corresponding to the historical character string in the word information set; and sending the second recognized text to the terminal.

* * * * *